US009887955B1

(12) United States Patent
Son (10) Patent No.: US 9,887,955 B1
(45) Date of Patent: *Feb. 6, 2018

(54) MESSAGE QUEUES FOR RAPID RE-HOSTING OF CLIENT DEVICES (71) Applicant: SNAP Inc., Venice, CA (US)

(72) Inventor: Aaron Daniel Son, Santa Monica, CA (US)

(73) Assignee: SNAP INC., Venice, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/091,857

(22) Filed: Apr. 6, 2016

Related U.S. Application Data (63) Continuation of application No. 14/668,336, filed on Mar. 25, 2015, now Pat. No. 9,313,154.

(51) Int. Cl.
G06F 15/16 (2006.01)
H04L 12/58 (2006.01)
G06Q 10/10 (2012.01)

(52) U.S. Cl.
CPC .......... *H04L 51/34* (2013.01); *G06Q 10/107* (2013.01); *H04L 51/12* (2013.01); *H04L 51/14* (2013.01); *H04L 51/28* (2013.01)

(58) Field of Classification Search
CPC ....... G06Q 10/107; H04L 51/12; H04L 51/28; H04L 51/14
See application file for complete search history.

(56) References Cited

U.S. PATENT DOCUMENTS

| 6,038,295 | A | 3/2000 | Mattes |
| 6,658,454 | B1 | 12/2003 | Delany et al. |
| 6,775,229 | B1 | 8/2004 | Mo et al. |
| 6,980,909 | B2 | 12/2005 | Root et al. |
| 7,173,651 | B1 | 2/2007 | Knowles |
| 7,411,493 | B2 | 8/2008 | Smith |
| 7,535,890 | B2 | 5/2009 | Rojas |

(Continued)

FOREIGN PATENT DOCUMENTS

CA 2887596 A1 7/2015

OTHER PUBLICATIONS

"U.S. Appl. No. 14/668,336, Examiner Interview Summary dated Nov. 24, 2015", 3 pgs.

(Continued)

Primary Examiner — Chirag R Patel
(74) Attorney, Agent, or Firm — Schwegman Lundberg & Woessner, P.A.

(57) ABSTRACT

Connected gateway servers relay an electronic message from a first client device to a second client device by storing the message in respective user message queues associated with the sender and/or recipient of the message and then sending the message along a sequence of gateway servers to a gateway server that hosts the second client device. Upon receiving the electronic message at a first gateway server, a second gateway server that is hosting the second client device is identified and a sequence of gateway servers starting at the first gateway server and ending at the second gateway server is determined. Each gateway server in the sequence relays the message to the following gateway server in the sequence while maintaining user message queues. Failure of the last gateway server in the sequence results in the penultimate gateway server in the sequence assuming the responsibility of hosting the second client device.

20 Claims, 7 Drawing Sheets

(56) References Cited

U.S. PATENT DOCUMENTS

| | | |
|---|---|---|
| 7,623,848 B2 | 11/2009 | Rosenfelt et al. |
| 8,131,597 B2 | 3/2012 | Hudetz et al. |
| 8,199,747 B2 | 6/2012 | Rojas et al. |
| 8,332,475 B2 | 12/2012 | Rosen et al. |
| 8,718,333 B2 | 5/2014 | Wolf et al. |
| 8,724,622 B2 | 5/2014 | Rojas |
| 8,793,343 B1 | 7/2014 | Sorenson, III et al. |
| 8,874,677 B2 | 10/2014 | Rosen et al. |
| 8,909,679 B2 | 12/2014 | Roote et al. |
| 8,995,433 B2 | 3/2015 | Rojas |
| 9,040,574 B2 | 5/2015 | Wang et al. |
| 9,055,416 B2 | 6/2015 | Rosen et al. |
| 9,100,806 B2 | 8/2015 | Rosen et al. |
| 9,100,807 B2 | 8/2015 | Rosen et al. |
| 9,191,776 B2 | 11/2015 | Root et al. |
| 9,204,252 B2 | 12/2015 | Root |
| 9,313,154 B1 | 4/2016 | Son |
| 9,443,227 B2 | 9/2016 | Evans et al. |
| 9,489,661 B2 | 11/2016 | Evans et al. |
| 9,491,134 B2 | 11/2016 | Rosen et al. |
| 2005/0228867 A1 | 10/2005 | Osborne et al. |
| 2009/0055502 A1 | 2/2009 | Agarwal et al. |
| 2011/0202598 A1 | 8/2011 | Evans et al. |
| 2012/0209924 A1 | 8/2012 | Evans et al. |
| 2015/0036476 A1 | 2/2015 | Vos |

OTHER PUBLICATIONS

"U.S. Appl. No. 14/668,336, Final Office Action dated Sep. 23, 2015", 12 pgs.

"U.S. Appl. No. 14/668,336, Non Final Office Action dated May 15, 2015", 11 pgs.

"U.S. Appl. No. 14/668,336, Notice of Allowance dated Dec. 10, 2015", 5 pgs.

"U.S. Appl. No. 14/668,336, Response filed Jul. 22, 2015 to Non Final Office Action dated May 15, 2015", 11 pgs.

"U.S. Appl. No. 14/668,336, Response filed Nov. 23, 2015 to Final Office Action dated Sep. 23, 2015", 12 pgs.

Leyden, John. "This SMS will self-destruct in 40 seconds", [Online]. Retrieved from the Internet: <URL: http://www.theregister.co.uk/2005/12/12/stealthtext/, (Dec. 12, 2005), 1 pg.

MESSAGE QUEUES FOR RAPID RE-HOSTING OF CLIENT DEVICES

CLAIM OF PRIORITY

This application is a continuation of U.S. patent application Ser. No. 14/668,336, filed Mar. 25, 2016, which is hereby incorporated by reference in its entirety.

TECHNICAL FIELD

The subject matter disclosed herein generally relates to provisioning network server resources for generating and distributing electronic messages. More specifically, the present disclosure describes systems and methods for maintaining mirrored user message queues between electronic message gateway servers for the purpose of rapidly re-hosting a client device of a faulty gateway server.

BACKGROUND

The use of electronic messages for transmitting text, images and video has grown to the point where it is now often a mission-critical service. Individuals and organizations have come to view it as being vital to their everyday operations. In fact, any particular message may be transmitting valuable information that a user of a messaging system simply cannot afford to lose.

Message gateways (e.g. servers or routers) are used to manage the flow of messages across a network. Gateways may also serve other functions like email security and/or hygiene. One function of message gateway servers is that they can receive a message from external systems (e.g. a client device) via a public network, such as the Internet, queue them locally for processing, and/or relay them on to other message gateway servers where they can be accessed by other client devices. Before being relayed, electronic messages are typically stored in queues on the gateways. Relaying the message may not be possible if the target gateway is unreachable due to a network error, temporarily down for maintenance, or unavailable for any other reasons. This may result in the message being "stuck" on a system that cannot deliver the message to client devices of the non-functioning gateway server.

BRIEF DESCRIPTION OF THE DRAWINGS

The present disclosure is illustrated by way of example, and not by way of limitation, in the figures of the accompanying drawings, in which.

DETAILED DESCRIPTION

Although the present disclosure is described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense.

A network system (e.g. a messaging system) may provision network gateway server resources in order to relay electronic messages between users of the network. This provisioning may be done by re-hosting a client device of a non-functioning gateway server to a functioning gateway server that includes a mirrored queue of messages sent and received by a user of the client device. In an example embodiment a 'source' gateway server receives an electronic message from a first client device of the source gateway server, stores the message locally and then transmits the message to one or more 'chain' gateway servers for storage and/or further transmission. Receipt of the original message by the source gateway server may be acknowledged to the client device that originated the message. The message is processed and relayed by the source gateway server to the next server in the delivery chain and so on to at least one gateway server that is hosting a second client device of a user that is a designated recipient of the message. During the time period between receiving the message at the source gateway server and transmitting the message to the client device of the designated recipient of the message, the network system is monitored, for example via a message processing module as explained in more detail below. If a gateway server hosting the second client device of the designated recipient is determined to have failed, the second client device may be re-hosted to another of the gateway servers in the delivery chain in order to allow the second client device to receive the message.

The foregoing has outlined rather broadly the features and technical advantages described herein so that the detailed description that follows may be better understood. The distinct embodiments will be described in relation to mobile wireless communication devices; hereafter referred to as client devices, for sending and receiving electronic messages, such as text, images or video and associated gateway servers for receiving and forwarding messages to and from the client devices and each other. It will be appreciated by those skilled in the art, however, that this description is not intended to limit the scope of the described embodiments to the communication devices described below or to a specific form of electronic message. The methods and systems described herein may be applied to any appropriate communication or data processing device and to any appropriate electronic communication format.

Overview

Servers acting as message gateways in a network messaging system may maintain mirrored queues of messages sent and received by client devices of each of the gateway servers. The connected gateway servers relay an electronic message from a first client device to a second client device by storing the message in respective user message queues associated with the sender and recipient of the message and then sending the message along a sequence of gateway servers to a gateway server that hosts the second client device.

Figure 1:
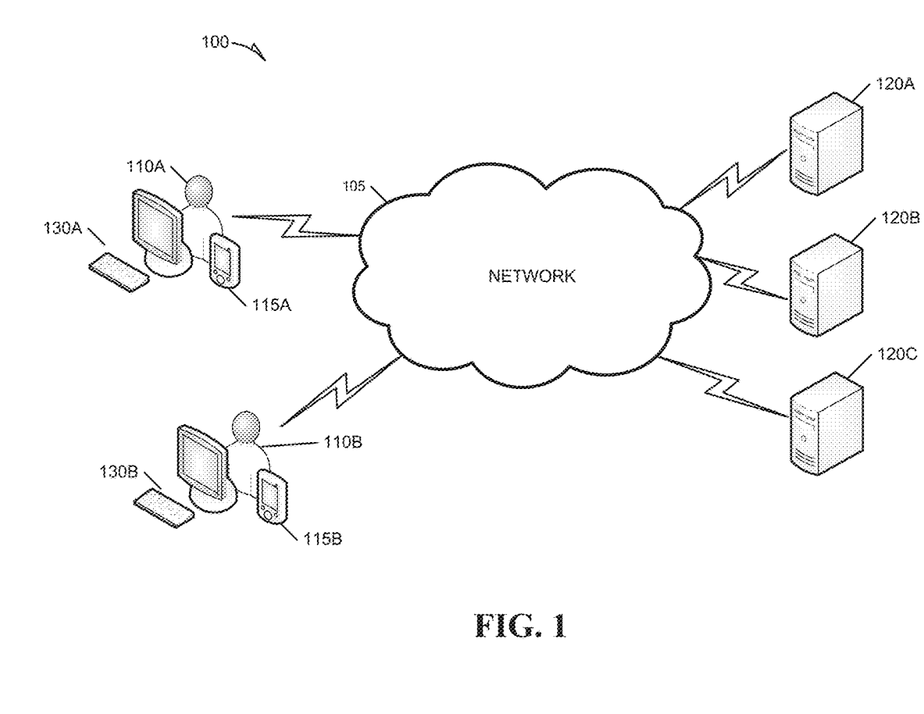
FIG. 1 is a block diagram showing a network system configured to transmit messages over a network consistent with some embodiments.

FIG. 1 is a block diagram showing a network system 100 configured to transmit data over a network 105 (e.g. a local-area network (LAN), a wide-area network (WAN), the Internet, or other private or public network systems) consistent with some embodiments. In an embodiment, network servers 120A, 120B and 120C provide network resources for use by client devices. For example the servers may function as message gateways for electronic messages sent between client devices of the servers wherein each such "gateway server" is communicatively coupled to at least one other gateway server for the purpose of sending and receiving electronic messages. Each of the gateway servers 120A, 120B and 120C may have the same configuration for the purposes of delivering electronic messages, and each of the gateway servers may forward such messages received from external sources (e.g. a client device) or from other gateway servers using the same settings and applying the same policies for message transmission/reception.

The client device may be a mobile device 115A or a more static device (e.g. desktop computer) 130A of a user 110A of network 105. The network activity of the users (e.g. 110A) may be monitored and upon receiving an electronic message at a first gateway server 120A from a first client device 115A (e.g. of user 110A) sent to a second client device 115B (e.g. of user 110B), a second gateway server 120C that is hosting the second client device 115B is identified and a sequence of gateway servers starting at the first gateway server 120A and ending at the second gateway server 120C is determined. Each gateway server in the sequence (e.g. 120B) relays the message to the following (e.g. subsequent) gateway server in the sequence (if there is a subsequent server) while maintaining mirrored user message queues for users (110A and/or 110B) of the client devices. Failure of the last gateway server 120C in the sequence results in the penultimate gateway server in the sequence (e.g. 120B) assuming the responsibility of hosting the second client device 115B. It shall be understood that messages sent in the reverse direction (e.g. sent from user 110B to 110A) could just as easily be processed according to the procedures as described herein.

As mentioned above, the first step is to detect that an electronic message from a first client device 115A has been received at a first gateway server 120A of the gateway servers of network system 100. The electronic message may designate a user 110B of network system 100 as a recipient of the message and may include, for example, text, audio, video, or any other form of communication that can be transmitted from one network user to another. It is noted that multiple recipients may be designated and the steps described herein would apply equally for sending a copy of the message to each of the recipients. In some embodiments, the process may be optimized with regard to message transmission to multiple recipients, for example embodiments contemplate sending only one copy of the message along a shared path segment of two separate gateway server sequences determined for delivery of the message to two designated recipients. A second gateway server 120C of the gateway servers of network system 100, which is hosting a second client device 115B that is associated with user 110B, is then identified. A sequence of gateway servers that starts at the first gateway server 120A and ends at the second gateway server 120C is then determined. The determination of the gateway server sequence may be based on, for example, a local domain configuration or a load balancing scheme.

Each of the gateway servers (e.g. 120A, 120B, 120C, etc.) in the determined sequence relays the message forward by first storing the electronic message in respective user message queues associated with at least one of the sender 110A and recipient 110B of the electronic message. The user message queues may store recently sent and received messages for users of client devices of each of the respective gateway servers. Generally, the user message queues comprise a storage mechanism such as a folder, directory or a set of folders or directories or a database that stores the files making up each individual message. Each gateway server that receives the electronic message replicates a copy of the message to one or more user message queues and then sends (e.g. transmits) the electronic message to the gateway server that follows it in the determined sequence of gateway servers if there is such a subsequent server. In other words, each application server 218 in the sequence 218S sends the message to a subsequent gateway server in the sequence based on the subsequent gateway server following it in the sequence. If it is detected that the last gateway server 120C in the determined sequence is not functioning (e.g. cannot receive the message or cannot forward the message to client device 115B) then the system may rapidly re-host the client device 115B of the user 110B using the penultimate gateway server (e.g. 120B) in the determined sequence. If a gateway server of the determined sequence, other than the last gateway server 120C (e.g. 120B) is not functioning then a new sequence of gateway servers may be determined, for example from the gateway server that precedes non-functioning gateway server 120B (e.g. 120A) to the last gateway server 120C.

In some embodiments, each of the gateway servers in the sequence (e.g. 120A, 120B, 120C, etc.) stores a copy of the message in respective queues associated with the sender 110A and recipient 110B of the electronic message. In this way any of the gateway servers of the sequence may function to host the client device 115A of the sender 110A or the client device 115B of the recipient 110B for the purpose of the electronic messaging between the respective client devices 115A and 115B. However, in other embodiments a continuous "chain" of gateway servers in the sequence (e.g. 120A and 120B) may be assigned to a particular user for the purpose of maintaining a queue of recently sent and received messages for said user. For example, a first chain of the gateway servers in the sequence (e.g. 120A and 120B) may be assigned to the sender 110A of the message, the first chain starting at the first gateway server 120A in the sequence and ending at a third gateway server 120B of the sequence that is prior to the second gateway server 120C which is the last gateway server of the sequence. A second chain of the gateway servers in the sequence (e.g. just 120C in this example) may be assigned to the recipient 110B of the message, the second chain starting at the gateway server of the sequence that follows the third gateway server 120B in the sequence (e.g. 120C) and ending at the second gateway server (e.g. the same 120C in this example). In this way, the servers in the first chain (120A and 120B) would store the messages in the queue for the sender 110A and not host a queue for messages sent or received by the recipient 110B while the servers in the second chain (e.g. 120C) would only store the sent/received messages for the recipient user 110B in a queue. Therefore every message sent by 110A, regardless of the recipient, is stored on all of the servers of the first chain (120A and 120B)

and all of the messages received by 110A, regardless of the sender, are also stored also on all of those servers (120A and 120B) as well. Accordingly, any of the gateway servers of the first chain (120A and 120B) may function to host the client device 115A of the sender 110A while any of the gateway servers of the second chain (120C) may function to host the client device 115B of the recipient 110B for the purpose of the electronic messaging between the respective client devices 115A and 115B.

In some embodiments, each of the gateway servers in the sequence (e.g. 120A, 120B, 120C, etc.) acknowledges receipt of the electronic message after storing the electronic message in the respective user message queues. For example, gateway server 120B may acknowledge receipt of the message from gateway server 120A and the system may determine that gateway server 120A is functioning to transmit and gateway server 120B is functioning to receive. In embodiments the acknowledgement may be provided to a central message processor, like the message processing module described below, and/or to the gateway server from which the message was received, e.g. gateway server 120A. An acknowledgement may also be provided to the sending client device 115A, for example, receipt of the message by second client device 115B may comprise a triggering event, as explained below, for which an acknowledgment may be provided to the sending client device 115A. In this way, detecting that the last gateway server in the sequence 120C is not functioning may be based on gateway server 120C failing to acknowledge receipt of the electronic message. The client device 115B hosted by gateway server 120C may acknowledge receipt of the message from gateway server 120C and if receipt of the message is not acknowledged by client device 115B then it may be assumed that gateway server 120C is not functioning properly. In another embodiment, the receiving source gateway server 120A may apply policy processing and/or sanitizing prior to transmitting a copy of the message to one or more of the other gateway servers (e.g. 120B). The policy processing may comprise filters and checks that are applied to messages processed by a gateway server (e.g. 120A) in order to, for example, enforce policies such as limits on user messages sent or limits to how long an ephemeral message may be viewed or are enforced. The sanitizing may comprise filters and checks that are applied to messages processed by a gateway server in order to, for example, block potentially harmful messages or removing excessively large attachments from a message. In this embodiment, the source gateway server may also transmit processing information such as status flags, or the like, that indicate the results of applying the policies. In this way processing requirements may be reduced by only applying policies or sanitizing measures once.

In some embodiments, a gateway server of the sequence of gateway servers that has been determined to not be functioning properly (e.g. 120C) may subsequently return to functioning service within network system 100. In this situation the respective user message queues of the gateway servers in the determined sequence (e.g. 120A, 120B, etc.) and the user message queues of the gateway server 120C that is now once again functioning are synchronized so that the newly functioning gateway server 120C may once again host network users for the purpose of sending and receiving electronic messages. For example, gateway server 120C may take over from gateway server 120B which had hosted client device 115B of user 110B when gateway server 120C was detected to not be functioning properly. The newly synchronized user message queues of gateway server 120C allow it to seamlessly assume the hosting responsibilities for client device 115B without any loss of message data.

In some embodiments, the messages being transmitted across network system 100 are ephemeral messages that are configured to be deleted from the respective user message queues of each of the gateway servers (e.g. 120A, 120B, 120C, etc.), of the determined sequence of gateway servers, based on the detection of a triggering event such as the message being read by all of the recipients of the message (e.g. a message may be set to be viewable for only a predetermined amount of time) or after a specified period of time (e.g. a message may be viewable any number of instances during a set period of time). In some embodiments, the triggering event comprises the electronic message being received at the second client device 115B or a response to the electronic message being sent from the second client device 115B. For example, a message may be deleted from the mirrored message queues of the gateway servers based on a specified period of time having passed or they may be deleted earlier based on a response to the message being sent from client device 115B prior to the expiration of the specified time period. Furthermore, detection of the triggering event comprising the message being received at the second client device 115B may also result in a message received acknowledgement being provided to the sending client device 115A.

In an embodiment, deleting the message from the respective user message queues of the gateway servers (e.g. 120A, 120B, 120C, etc.), of the determined sequence of gateway servers, based on expiration of the specified time period may comprise removing the electronic message from the respective user message queues and storing a copy of the message in an external storage, for example an external database. The message may later be copied from the external storage and transmitted along a sequence of gateway servers to gateway server 120C based on detecting that user 110B of client device 115B is ready to receive the message, for example user 110B may have launched an ephemeral messaging application on client device 115B which results in automatic reception of any messages that have not yet been received from users of network 100.

System Architecture

Figure 2A:
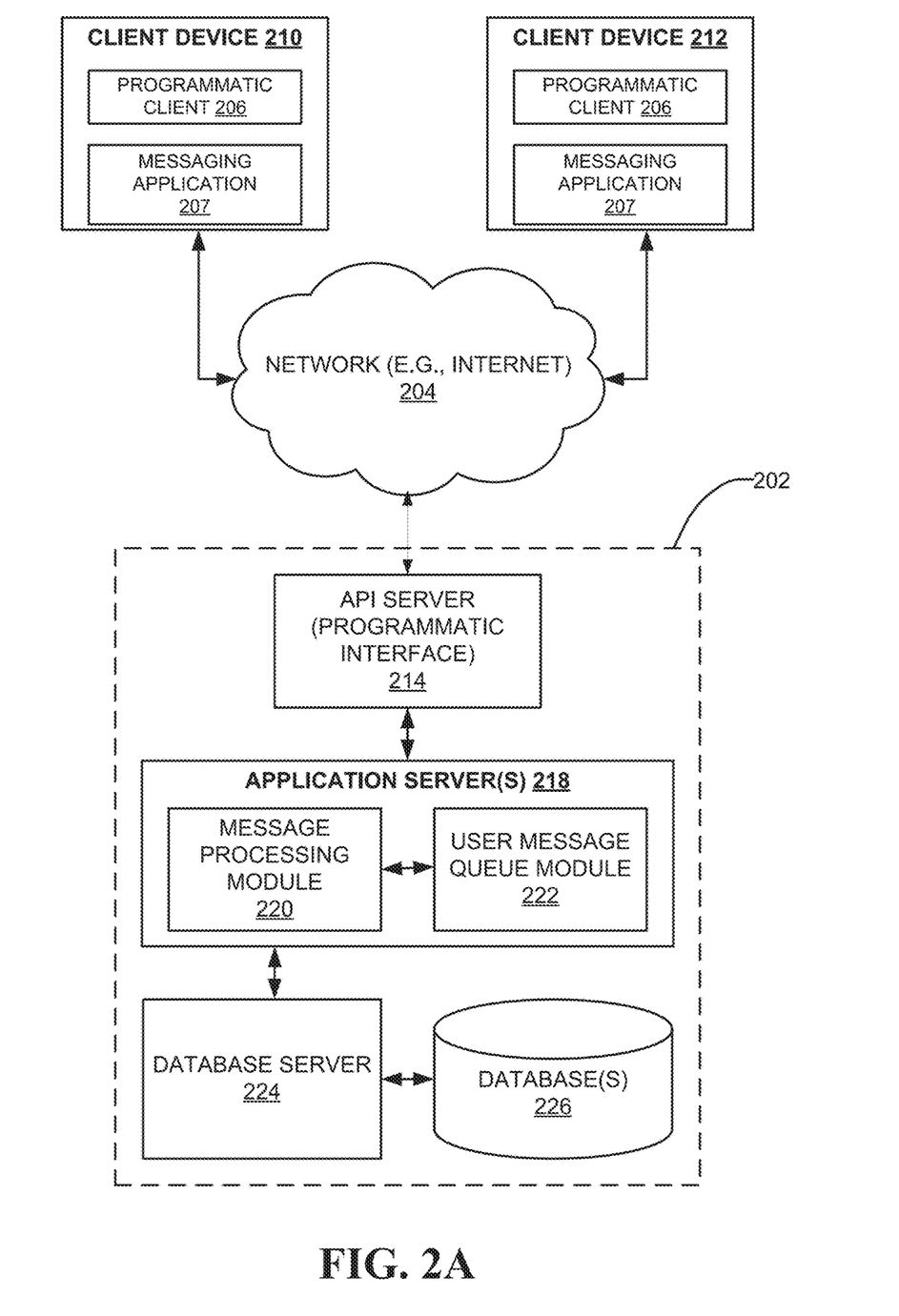
FIG. 2A is a block diagram illustrating an example of a network environment including a server operating a system for allocating network resources for processing and storing messages among users of client devices, consistent with some embodiments.

FIG. 2A is a network diagram depicting a network system 200 having a client-server architecture configured for exchanging data over a network, according to one embodiment. For example, the network system 200 may be a messaging system where clients may communicate and exchange data within the network system 200. The data may pertain to various functions (e.g. sending and receiving text, photo and video communications) and aspects (e.g. publication of blogs and websites) associated with the network system 200 and its users. Although illustrated herein as client-server architecture, other embodiments may include other network architectures, such as peer-to-peer or distributed network environments.

A data exchange platform 202, in an example, includes a message processing module 220 and a user message queue module 222, and may provide server-side functionality via a network 204 (e.g. the Internet) to one or more client devices. Although described as residing on a server (e.g. application server(s) 218) in some embodiments, in other embodiments some or all of the functions of message processing module 220 and a user message queue module 222 may be provided by a client device. The one or more clients may include devices (e.g. 115A and 115B) that use the network system 200 to exchange data over the network 204. These operations may include transmitting, receiving (communicating), and processing data to, from, and regarding content and users of the network system 200. The data may include, but is not limited to, content and user data such as user profiles, messaging content, messaging attributes, client device information, and geolocation information, among others.

In various embodiments, the data exchanges within the network system 200 may be dependent upon user-selected functions available through one or more client or user interfaces (UIs). The UIs may be associated with a client machine, such as client devices 210, 212 using a programmatic client 206, such as a client application. The programmatic client 206 may be in communication with the message processing module 220 and a user message queue module 222 at least one of application server(s) 218. The client devices 210, 212 may comprise mobile devices with wireless communication components and applications for sending specific types of electronic messages over network 204 (e.g. messaging application 207).

Turning specifically to the message processing module 220 and user message queue module 222, an application program interface (API) server 214 is coupled to, and provides programmatic interface to one or more application server(s) 218 that host the message processing module 220 and a user message queue module 222. The application server(s) 218 are, in turn, shown to be coupled to a database server 224 and one or more database(s) 226 for storing and/or accessing network data.

The API server 214 communicates and receives data pertaining to messages, among other things, via various user input tools. For example, the API server 214 may send and receive data to and from an application (e.g. via the programmatic client 206) running on another client machine (e.g. client devices 210, 212 or a third party server).

In one example embodiment, the message processing module 220 provides monitoring mechanisms for users of the client devices 210 and 212 in order to obtain user activity data. The application server(s) 218 can access and view the user activity data from, for example, the database 226.

Application server(s) 218 provide network resources for use by client devices, such as client devices 210 and 212. Each of the client devices 210 and 212 may be a mobile device such as a cell phone (e.g. like 115A) or a more static device like a desktop computer (e.g. like 130A) of a user (e.g. like 110A) of network 204. The network activity of the users (e.g. 110A) may be monitored via the message processing module 220 and used to assist in the processing of messages between the user(s) of the client devices of data exchange platform 202 (e.g. 210 and 212). The application servers 218 may then act as connected gateway servers to relay an electronic message from a first client device 210 to a second client device 212 by storing the message in respective user message queues associated with the sender and recipient of the message (e.g. users 110A and 110B) and then sending the message along a determined sequence of application servers 218 to an application server 218 that hosts the second client device 212.

The activities of client devices 210 and 212 may be monitored, for example, via a messaging application 207 residing on each of the devices. The activities of client devices 210 and 212 may also be monitored via application server(s) 218 which may, via user message queue module 222, instruct each of the application servers 218 in the determined sequence to record any user messages that are sent to or received by respective user message queues associated with each of the users (e.g. 110A and 110B) stored in each the application server(s) 218. This user message queue data may also be stored in database 226, e.g. via database server 224. The network activity of the users (e.g. 110A) is monitored and upon receiving an electronic message at a first application server 218 from a first client device 210 which designates a user associated with a second client device 212 as a recipient of the message, a second application server 218 that is hosting the second client device 212 is identified and a sequence of application servers 218 starting at the first application server 218 and ending at the second application server 218 is determined. Each application server 218 in the determined sequence relays the message to the following application server 218 in the sequence (if there is such a following server) while maintaining mirrored user message queues for users (e.g. 110A and 110B) of the client devices 210 and 212. Failure of the last application server 218 in the sequence (e.g. the identified second application server 218) results in the penultimate gateway server in the determined sequence (e.g. the first application server 218 if only two servers comprise the determined sequence) assuming the responsibility of hosting the second client device 212.

As mentioned above, in certain embodiments the first step is to detect that an electronic message from a first client device 210 has been received at a first one of the application servers 218 of data exchange platform 202. The electronic message may designate a user (e.g. 110B) of network system 200 as a recipient of the message and may include, for example, text, audio, video, or any other form of communication that can be transmitted from one network user to another. It is noted that multiple recipients may be designated and the steps described herein would apply equally for sending a copy of the message to each of the recipients while optimizing the process with regard to message transmission to multiple recipients, as noted above. The message processing module 220 then identifies a second one of the application servers 218 which is hosting a second client device 212 that is associated with the user (e.g. 110B) that is designated as a recipient of the message. A sequence of application servers 218 that starts at the first application server 218 and ends at the second application server 218 is then determined by the message processing module 220. The determination of the application server 218 sequence for transmitting the message may be based on various factors, such as, a local domain configuration or a load balancing scheme.

Each of the application servers 218 in the determined sequence is then instructed, by the user message queue module 222, to store the electronic message in respective user message queues associated with the sender (e.g. 110A) and/or recipient (e.g. 110B) of the electronic message. In this way, the user message queues may store recently sent and received messages for users of client devices 210 and 212 of the application servers 218. Generally, the user message queues comprise a storage mechanism such as a folder, directory or a set of folders or directories or a database that stores the files making up each individual message. Each of the application servers 218 that receives the electronic message is instructed by the user message queue module 222 to replicate a copy of the message to one or more user message queues (e.g. the sender and/or recipient). Each of these application servers 218 then sends (e.g. transmits) the electronic message to a subsequent application server 218 that follows it in the determined sequence of application servers 218. If it is detected, via the message processing module 220, that the last one of the application servers 218 in the determined sequence is not functioning then the data exchange platform 202 may rapidly re-host the client device 212 of the receiving user (e.g. 110B) using the penultimate one of the application servers 218 in the determined sequence using the messages stored in the respective user message queue of the penultimate one of the application servers 218. If one of the application servers 218 of the determined sequence, other than the last one of the application servers 218 in the sequence is not functioning then a new sequence of application servers 218 may be determined by the message processing module 220, for example starting from the one of the application servers 218 in the sequence that precedes non-functioning server to the last one of the application servers 218 of the determined sequence.

In embodiments, each of the application servers 218 of the determined sequence acknowledges receipt of the electronic message after storing the electronic message in the respective user message queues. For example, a second application server 218 of the determined sequence may acknowledge receipt of the message from the first application server 218 of the sequence and the message processing module 220 may determine that the first application server 218 is functioning to transmit and the second application server 218 is functioning to receive. In this way, detecting that the last application server 218 in the determined sequence is not functioning may be based on the last application server 218 failing to acknowledge receipt of the electronic message.

The client device 212 hosted by the last application server 218 may also, through messaging application 207 (e.g. an ephemeral messaging application), acknowledge receipt of the message from the last application server 218 and if receipt of the message is not acknowledged by client device 212 then it may be assumed that the last application server 218 is not functioning properly (e.g. to transmit). In another embodiment, the first application server 218 in the sequence (e.g. receives message from client device 210) may apply policy processing and/or sanitizing prior to transmitting a copy of the message to one or more of the other application servers 218. In this embodiment, the first application server 218 in the sequence may also transmit processing information such as status flags, or the like, that indicate the results of applying the policies. In this way processing requirements may be reduced by only applying policies or sanitizing measures once.

In an embodiment, the messages being transmitted across network system 200 are ephemeral messages that are configured to be deleted from the respective user message queues of each of the application servers 218 (e.g. 120A, 120B, 120C, etc.) of the determined sequence, based on the detection by message processing module 220 of a triggering event such as an electronic message being read by all of the designated recipients of the message or a passage of a specified period of time. In embodiments, the triggering event comprises the electronic message being received at the second client device 212 or a response to the electronic message being sent from the second client device 212. For example, a message may be deleted from the mirrored message queues of the application servers 218 of the determined sequence based on a specified period of time having passed or they may be deleted earlier based on a response to the message being sent from client device 212 prior to the expiration of the specified time period.

In an embodiment, deleting the message from the respective user message queues of the application servers 218 of the determined sequence based on expiration of the specified time period may comprise instructing, by the user message queue module 222, each of the application servers 218 of the determined sequence to remove the electronic message from their respective user message queues and transmit a copy of the message to an external storage such as database 226. In this way the message may be copied from the database 226 and transmitted along a sequence of application servers 218 to an application server 218 that is hosting a client device 212 based on detecting that user (e.g. 110B) of client device 212 is ready to receive the message, for example the user may have launched an ephemeral messaging application 207 on client device 212 which results in automatic reception of any messages that have not yet been received by users of data exchange platform 202, e.g. such as users 110A or 110B.

Sequence of Gateway Servers

Figure 2B:
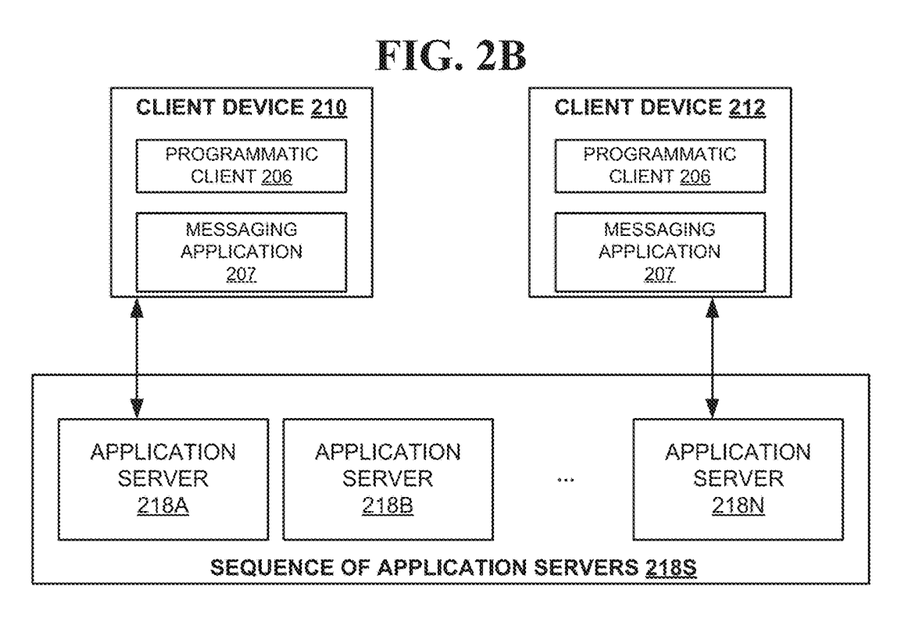
FIGS. 2B-2C are block diagrams illustrating an example of a sequence of gateway servers rapidly re-hosting a client device.
Figure 2C:
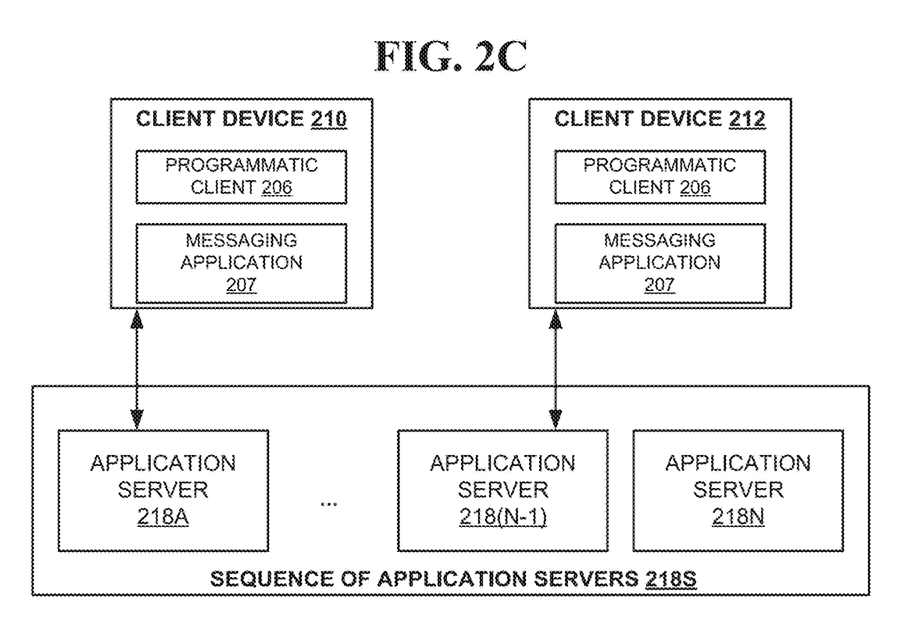

FIGS. 2B-2C are block diagrams illustrating an example of a sequence of gateway servers rapidly re-hosting a client device. As shown in FIG. 2A, after an electronic message from a first client device 210 has been received at a first application server 218A of the application servers 218 the message processing module 220 then identifies a second application server 218N of the application servers 218 which is hosting a second client device 212 that is associated with the user (e.g. 110B) that is designated as a recipient of the electronic message. A sequence 218S of application servers 218 that starts at the first application server 218A and ends at the second application server 218N (e.g. 218A, 218B . . . 218N) is then determined by the message processing module 220. As noted above, the determination of the application server sequence 218S for transmitting the message may be based on various factors, such as, a local domain configuration or a load balancing scheme.

Each of the application servers 218 in the determined sequence 218S is then instructed, by the user message queue module 222, to store the electronic message in respective user message queues associated with the sender (e.g. 110A) and recipient (e.g. 110B) of the electronic message. In this way, the user message queues may store recently sent and received messages for users of client devices 210 and 212 of the application servers 218. As noted above, the user message queues comprise a storage mechanism such as a folder, directory or a set of folders or directories or a database that stores the files making up each individual message. Each application server 218 in the sequence 218S that receives the electronic message is instructed by the user message queue module 222 to replicate a copy of the message to one or more user message queues (e.g. the sender and recipient). Each application server 218 in the sequence 218S then sends (e.g. transmits) the electronic message to the application server 218 that follows it in the determined sequence of application servers 218 if there is such a next sever in the sequence, e.g. each application server 218 in the sequence 218S sends the message to another (e.g. subsequent) gateway server in the sequence based on the other gateway server following it in the sequence.

As shown in FIG. 2B, if it is detected, via the message processing module 220, that the last application server 218N in the determined sequence 218S is not functioning (e.g. cannot receive the message or cannot forward the message to client device 212), then the data exchange platform 202 may rapidly re-host the client device 212 of the receiving user (e.g. 110B) using the penultimate application server 218(N-1) in the determined sequence 218S using the messages stored in the respective user message queue of the penultimate application server 218(N-1). If an application server 218 of the determined sequence, other than the last application server 218N (e.g. 218B) is not functioning then a new sequence of application servers 218 may be determined by the message processing module 220, for example starting from the application server 218 that precedes non-functioning server (e.g. 218A) to the last the last application server 218N of the determined sequence 218S.

In some embodiments, each of the application servers 218 in the determined sequence 218S stores a copy of the message in respective queues associated with the sender 110A and recipient 110B of the electronic message. In this way any of the gateway servers of the sequence may function to host the client device 210 of the sender 110A or the client device 212 of the recipient 110B for the purpose of the electronic messaging between the respective client devices 210 and 212. However, in other embodiments a continuous "chain" of gateway servers 218 in the sequence (e.g. 218A and 218B) may be assigned to a particular user for the purpose of maintaining a queue of recently sent and received messages for said user. For example, a first chain of the gateway servers 218 in the sequence 218S may be assigned to the sender 110A of the message, the first chain starting at the first gateway server 218A in the sequence and ending at a third gateway server 218B of the sequence that is prior to the second gateway server 218N which is the last gateway server of the sequence. A second chain of the gateway servers in the sequence (e.g. 218(N-1) and 218N) may be assigned to the recipient 110B of the message, the second chain starting at the gateway server of the sequence that follows the third gateway server 120B in the sequence (e.g. 218(N-1)) and ending at the second gateway server (e.g. 218N). In this way, the servers in the first chain (218A and 218B) would store the messages in the queue for the sender 110A and not host a queue for messages sent or received by the recipient 110B while the servers in the second chain (e.g. 218(N-1) and 218N) would only store the sent/received messages for the recipient user 110B in a queue. Therefore every message sent by 110A, regardless of the recipient, is stored on all of the servers of the first chain (218A and 218B) and all of the messages received by 110A, regardless of the sender, are also stored also on all of those servers as well. Accordingly, any of the gateway servers of the first chain (218A and 218B) may function to host the client device 210 of the sender 110A while any of the gateway servers of the second chain (e.g. 218(N-1) and 218N) may function to host the client device 212 of the recipient 110B for the purpose of the electronic messaging between the respective client devices 210 and 212.

In an embodiment, if an application server 218N of the determined sequence of gateway servers that has previously been determined to not be functioning subsequently returns to functioning service within data exchange platform 202, the respective user message queues of the application servers 218 in the determined sequence 218S and the user message queues of the newly functioning application server 218N are synchronized, via user message queue module 222, so that the newly functioning application server 218N may once again host network users for the purpose of sending and receiving electronic messages. For example, the newly functioning application server 218N may resume hosting a client device 212 of a user (e.g. 110B) that it had hosted before it was detected to not be functioning properly. The newly synchronized user message queues of the newly functioning application server 218N allow it to seamlessly assume the hosting responsibilities for client device 212 without any loss of message data.

Methods

Figure 3:
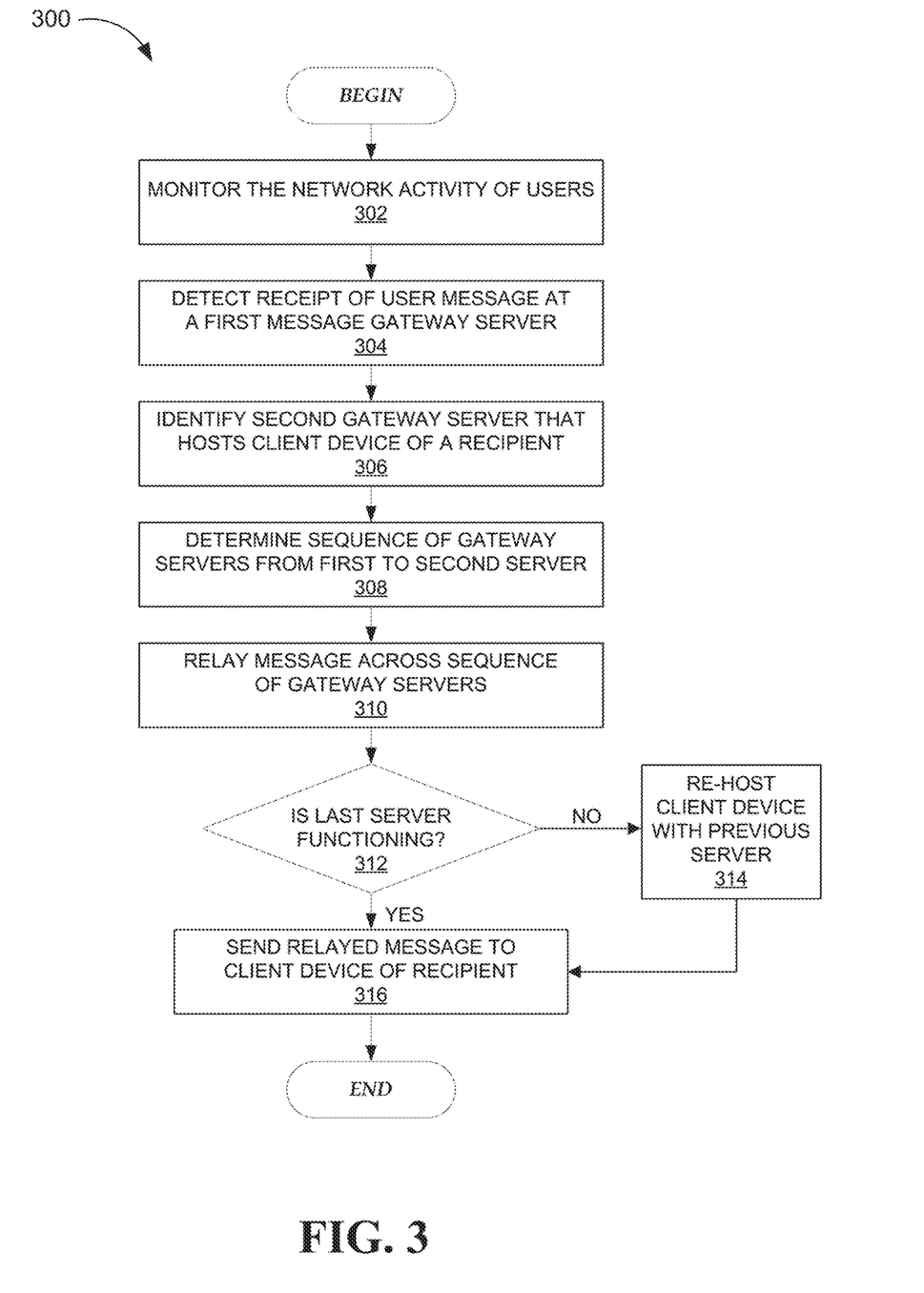
FIG. 3 is a flow diagram illustrating one example embodiment of an operation of the message processing module.

FIG. 3 is a flow diagram 300 illustrating one example embodiment of an operation of the message processing module 220. At operation 302, the network activity of a plurality of network users is monitored. The user activities may be monitored, for example, via a messaging application (e.g. messaging application 207) residing on client devices of the users. The user activities may also be monitored via network servers (e.g. application server(s) 218) which may record any user interaction with the network servers via the message processing module 220. The network activity data for the plurality of network users may be stored in database (e.g. database 226). At operation 304, the monitored user activity includes a message received at a first message gateway server from a first client device of the first message gateway server. The message may designate a second client device as a recipient of the message and may include any data (e.g. text, photo, video, etc.) that may be included in an electronic message. It is noted that multiple recipients may be designated and the steps described herein would apply equally for sending a copy of the message to each of the recipients.

At operation 306, a second gateway server which is hosting the second client device is identified. This may be accomplished, for example, by matching recipient information from the message with user profile data accessed by the message processing module 220 from database 226. At operation 308, a sequence of gateway servers that starts at the first gateway server and ends at the second gateway server is then determined by the message processing module 220. The determination of the gateway server sequence may be based on, for example, a load balancing scheme or a shortest path. At operation 310, each of the gateway servers in the determined sequence relays the message forward (if there is a subsequent gateway server following it in the sequence) by first storing the electronic message in respective user message queues associated with a sender and recipient of the electronic message, as explained more fully with respect to FIG. 4 below.

At operation 312, the message processing module 220 may detect that the last gateway server in the determined sequence is not functioning (e.g. cannot receive the message or cannot forward the message to the second client device). At operation 314, if it is detected that the last gateway server in the determined sequence (e.g. the "second" gateway server hosting the second client device designated as a recipient of the message which is identified at operation 306) is not functioning then the system may rapidly re-host the second client device using the penultimate gateway server in the determined sequence. Finally, at operation 316, if it is detected that the last gateway server in the determined sequence is functioning then the system transmits the message to the second client device using the last gateway server in the determined sequence.

Figure 4:
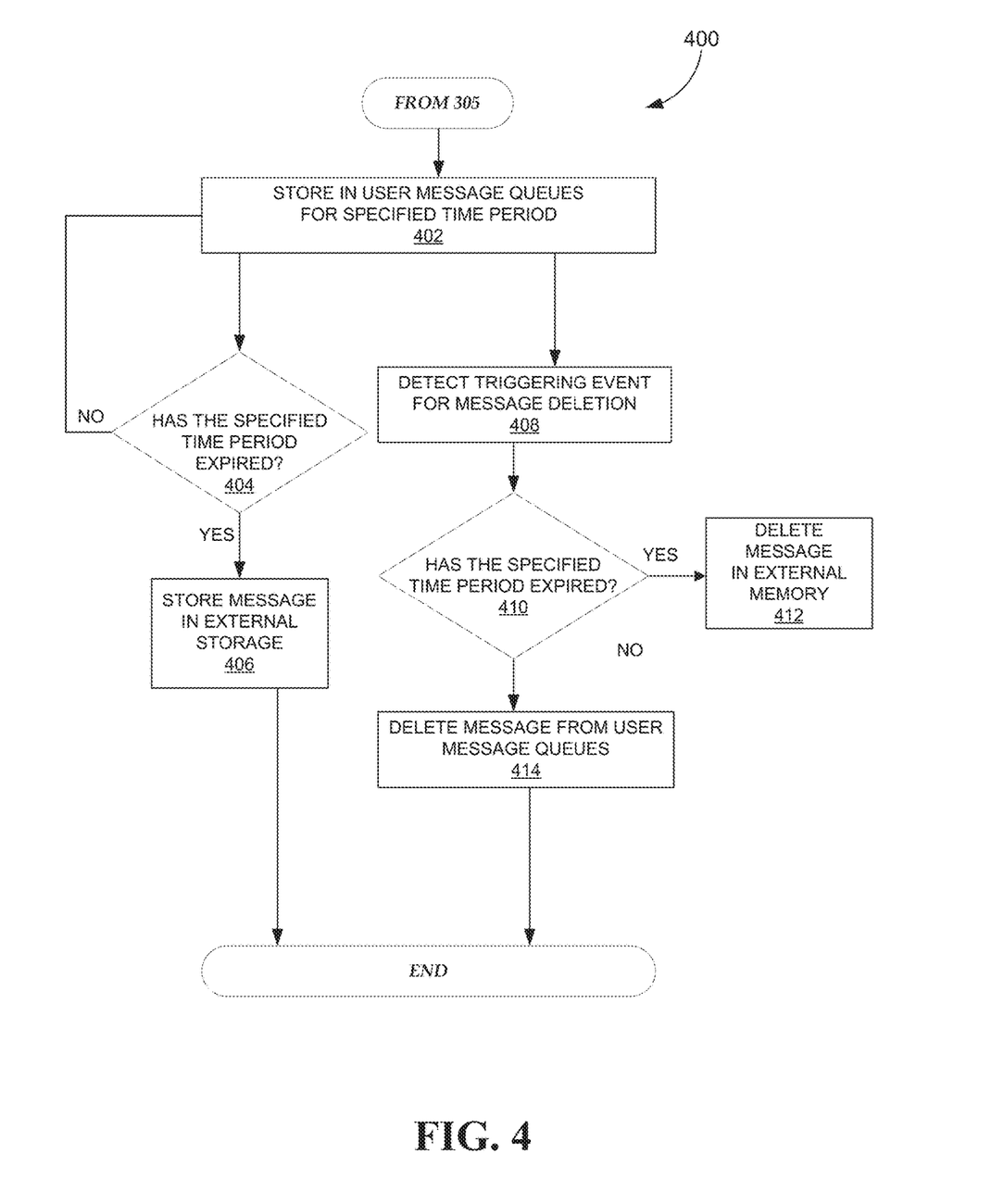
FIG. 4 is a flow diagram illustrating one example embodiment of an operation of the user message queue module.

FIG. 4 is a flow diagram 400 illustrating one example embodiment of an operation of the user message queue module 222. At operation 402 (which follows from operation 310 of method 300 of FIG. 3), each of the gateway servers in the determined sequence is instructed, by the user message queue module 222, to store the electronic message in respective user message queues associated with the sender and recipient of the electronic message before relaying (e.g. transmitting) the electronic message to the gateway server that follows it in the determined sequence of servers. The gateway servers are instructed to store the message in the queues for only a specified period of time so that the messages are ephemeral. In this way, the user message queues may store recently sent and received messages for users of client devices of the gateway servers. At operation 404, it is determined if the specified time period has expired and, if so, at operation 406 the message is removed from the queues and copied to an external storage such as database 226. In this way the message may be copied from the database 226 and transmitted along a sequence of gateway servers to a gateway server that is hosting the second client device.

At operation 408, message processing module 220 detects a triggering event such as an electronic message being read by all of the designated recipients of the message. In embodiments, the triggering event comprises the electronic message being received at a client device, viewing a message for a predetermined amount of time (e.g. in some embodiments a sender may indicate that a message may be viewed for six seconds, once the message has been viewed for six seconds, the triggering event is deemed to have occurred), or a response to the electronic message being sent from a client device. As discussed, a message may be deleted from the mirrored message queues of the of the gateway servers of the determined sequence based on a specified period of time having passed or it may be deleted earlier based on detection of a triggering event such as a response to the message being sent from a client device prior to the expiration of the specified time period.

At operation 410 it is determined whether the specified time period has expired after a triggering event has been detected. If it is determined that the specified time period has expired then, at operation 412, the message is deleted from the external storage based on the detection of the triggering event. If it is determined that the specified time period has not expired then, at operation 414, the message is deleted from the respective user message queues of the gateway servers of the determined sequence.

Modules, Components and Logic

Certain embodiments are described herein as including logic or a number of components, modules, or mechanisms. Modules may constitute either software modules (e.g. code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g. a standalone, client, or server computer system) or one or more processors may be configured by software (e.g. an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g. as a special-purpose processor, such as a field programmable gate array (FPGA) or an application-specific integrated circuit (ASIC)) to perform certain operations. A hardware-implemented module may also comprise programmable logic or circuitry (e.g. as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g. configured by software) may be driven by cost and time considerations.

Accordingly, the term "hardware-implemented module" should be understood to encompass a tangible entity, be that an entity that is physically constructed, permanently configured (e.g. hardwired), or temporarily or transitorily configured (e.g. programmed) to operate in a certain manner or to perform certain operations described herein. Considering embodiments in which hardware-implemented modules are temporarily configured (e.g. programmed), each of the hardware-implemented modules need not be configured or instantiated at any one instance in time. For example, where the hardware-implemented modules comprise a general-purpose processor configured using software, the general-purpose processor may be configured as respectively different hardware-implemented modules at different times. Software may, accordingly, configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g. over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource.

The various operations of example methods described herein may be performed, at least partially, by one or more processors that are temporarily configured (e.g. by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g. within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via the network 104 (e.g. the Internet) and via one or more appropriate interfaces (e.g. APIs).

Electronic Apparatus and System

Example embodiments may be implemented in digital electronic circuitry, or in computer hardware, firmware, or software, or in combinations of them. Example embodiments may be implemented using a computer program product (e.g. a computer program tangibly embodied in an information carrier, e.g. in a machine-readable medium for execution by, or to control the operation of, data processing apparatus, e.g. a programmable processor, a computer, or multiple computers).

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g. an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g. an ASIC), in temporarily configured hardware (e.g. a combination of software and a programmable processor), or in a combination of permanently and temporarily configured hardware may be a design choice. Below are set out hardware (e.g. machine) and software architectures that may be deployed in various example embodiments.

Example Computer System

Figure 5:
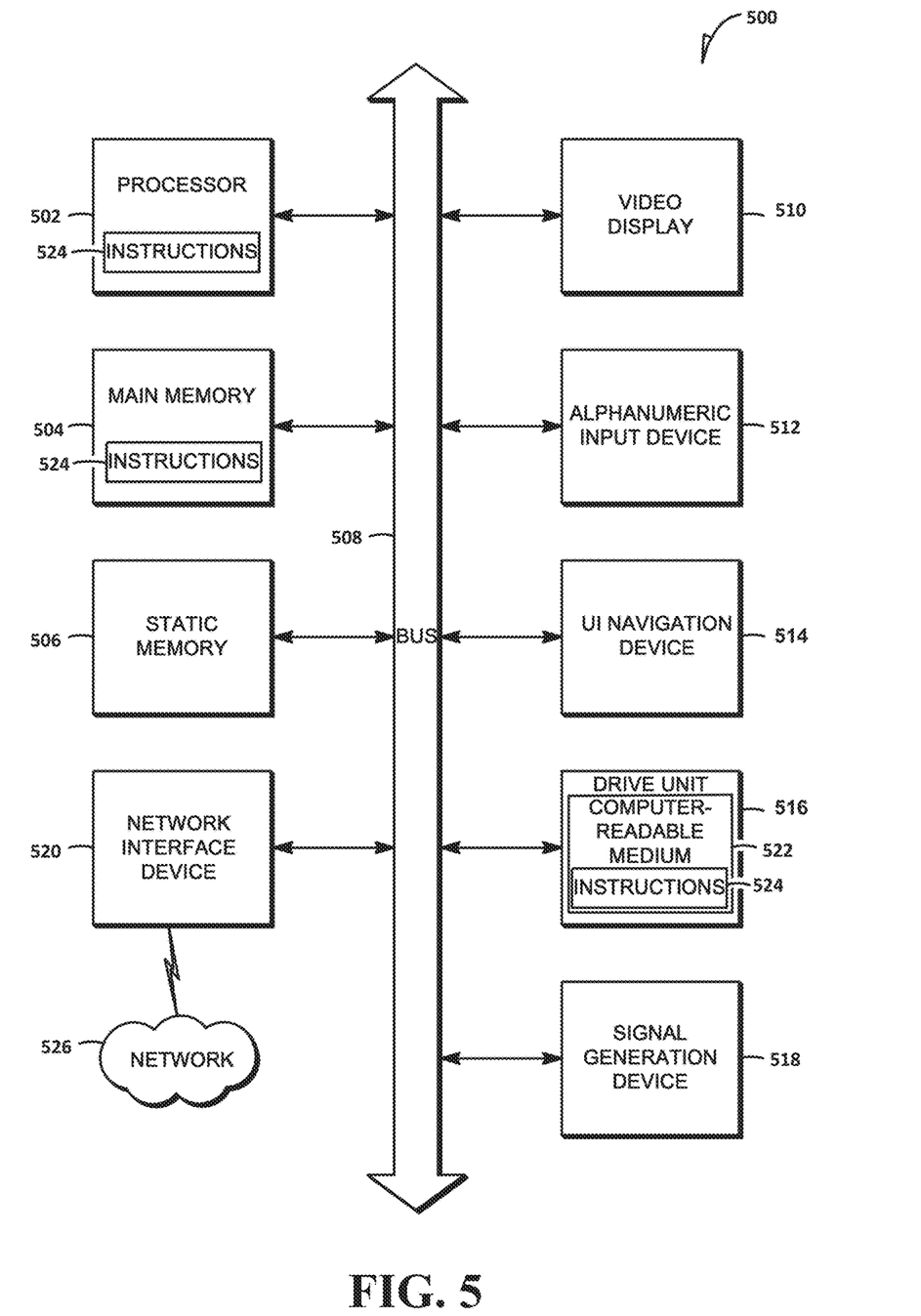
FIG. 5 is a diagrammatic representation of machine, in the example form of a computer system, within which a set of instructions may be executed to cause the machine to perform one or more of the methodologies discussed herein.

FIG. 5 shows a diagrammatic representation of a machine in the example form of a machine or computer system 500 within which a set of instructions 524 may be executed causing the machine to perform any one or more of the methodologies discussed herein. In alternative embodiments, the machine operates as a standalone device or may be connected (e.g. networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing a set of instructions 524 (sequential or otherwise) that specify actions to be taken by that machine. Further, while only a single machine is illustrated, the term "machine" shall also be taken to include any collection of machines that individually or jointly execute a set (or multiple sets) of instructions 524 to perform any one or more of the methodologies discussed herein.

The example computer system 500 includes a processor 502 (e.g. a central processing unit (CPU), a graphics processing unit (GPU), or both), a main memory 504, and a static memory 506, which communicate with each other via a bus 508. The computer system 500 may further include a video display unit 510 (e.g. a liquid crystal display (LCD) or a cathode ray tube (CRT)). The computer system 500 also includes an alphanumeric input device 512 (e.g. a keyboard), a UI navigation device 514 (e.g. a mouse), a drive unit 516, a signal generation device 518 (e.g. a speaker), and a network interface device 520.

The drive unit 516 includes a computer-readable medium 522 on which is stored one or more sets of data structures and instructions 524 (e.g. software) embodying or used by any one or more of the methodologies or functions described herein. The instructions 524 may also reside, completely or at least partially, within the main memory 504 or within the processor 502 during execution thereof by the computer system 500, with the main memory 504 and the processor 502 also constituting machine-readable photo.

The instructions 524 may further be transmitted or received over a network 526 via the network interface device 520 utilizing any one of a number of well-known transfer protocols (e.g. HTTP).

While the computer-readable medium 522 is shown in an example embodiment to be a single medium, the term "computer-readable medium" should be taken to include a single medium or multiple photo (e.g. a centralized or distributed database, and/or associated caches and servers) that store the one or more sets of instructions 524. The term "computer-readable medium" shall also be taken to include any medium that is capable of storing, encoding, or carrying a set of instructions 524 for execution by the machine that cause the machine to perform any one or more of the methodologies of the present disclosure, or that is capable of storing, encoding, or carrying data structures used by or associated with such a set of instructions 524. The term "computer-readable medium" shall, accordingly, be taken to include, but not be limited to, solid-state memories, optical photo, and magnetic photo.

Furthermore, the machine-readable medium is non-transitory in that it does not embody a propagating signal. However, labeling the tangible machine-readable medium "non-transitory" should not be construed to mean that the medium is incapable of movement—the medium should be considered as being transportable from one physical location to another. Additionally, since the machine-readable medium is tangible, the medium may be considered to be a machine-readable device.

Example Mobile Device

Figure 6:
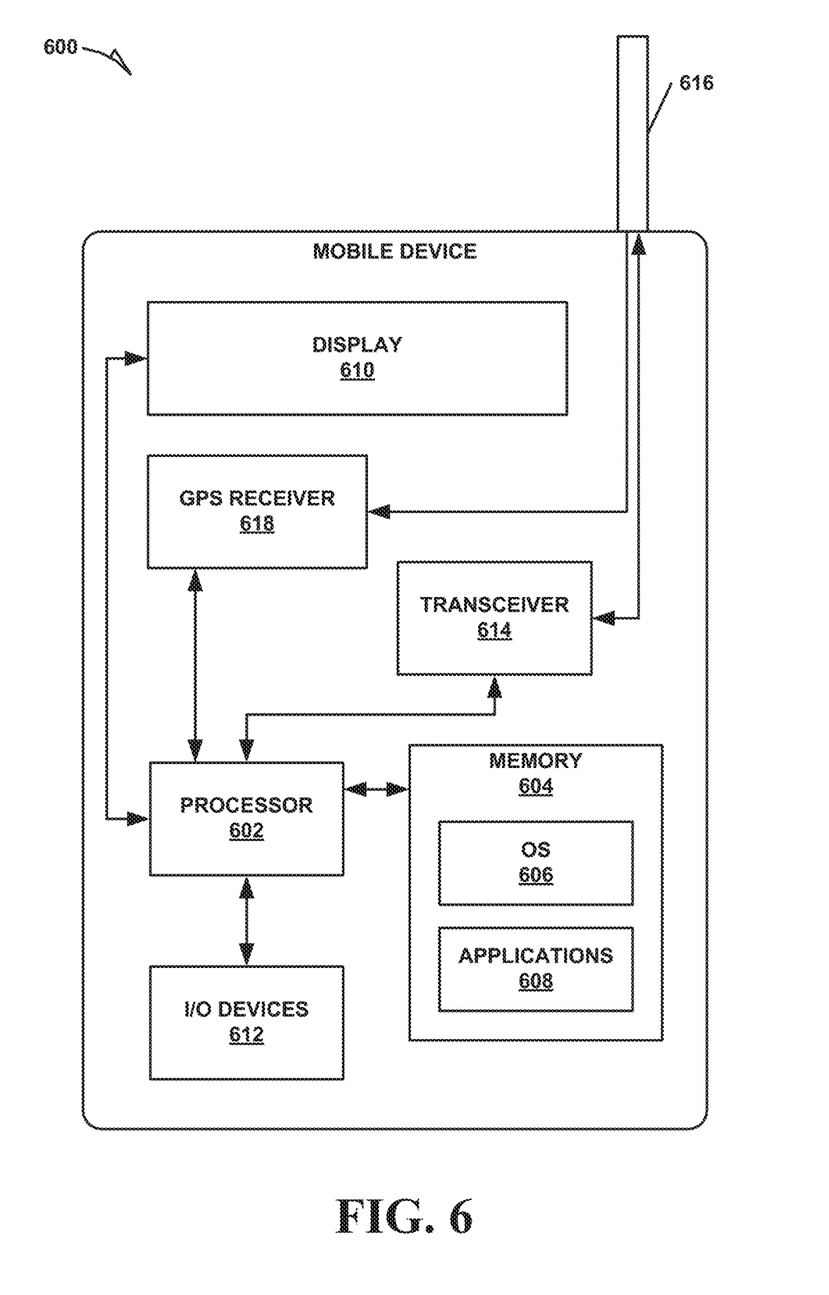
FIG. 6 is a block diagram illustrating a mobile device, according to an example embodiment.

FIG. 6 is a block diagram illustrating a mobile device 600, according to an example embodiment. The mobile device 600 may include a processor 602. The processor 602 may be any of a variety of different types of commercially available processors 602 suitable for mobile devices 600 (for example, an XScale architecture microprocessor, a microprocessor without interlocked pipeline stages (MIPS) architecture processor, or another type of processor 602). A memory 604, such as a random access memory (RAM), a flash memory, or another type of memory, is typically accessible to the processor 602. The memory 604 may be adapted to store an operating system (OS) 606, as well as applications 608, such as a mobile location enabled application that may provide location-based services (LBSs) to a user. The processor 602 may be coupled, either directly or via appropriate hardware, to a display 610 and to one or more input/output (I/O) devices 612, such as a keypad, a touch panel sensor, a microphone, and the like. Similarly, in some embodiments, the processor 602 may be coupled to a transceiver 614 that interfaces with an antenna 616. The transceiver 614 may be configured to both transmit and receive cellular network signals, wireless data signals, or other types of signals via the antenna 616, depending on the nature of the mobile device 600. Further, in some configurations, a GPS receiver 618 may also make use of the antenna 616 to receive GPS signals.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

Such embodiments of the inventive subject matter may be referred to herein, individually or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for relaying electronic messages between connected gateway servers, the method comprising:
   assigning a first chain of the gateway servers to a first client device, the first chain starting at a first gateway server of the gateway servers that hosts the first client device and ending at a second gateway server of the gateway servers;
   assigning a second chain of the gateway servers to a second client device, the second chain starting at a third gateway server of the gateway servers that hosts the second client device and ending at a fourth gateway server of the gateway servers;
   receiving, at the first gateway server, an electronic message from a sender associated with the first client device to a recipient associated with the second client device;
   determining a sequence of the gateway servers that starts at the first gateway server and ends at the third gateway server, the sequence comprising the first and second chains;
   sending, by each of the gateway servers in the sequence, the electronic message to the subsequent gateway server in the sequence;
   storing the electronic message in a message queue associated with the sender in each of the gateway servers of the first chain, and
   storing the electronic message in a message queue associated with the recipient in each of the gateway servers of the second chain.

2. The method of claim 1, further comprising each of the gateway servers in the sequence:
   detecting that a gateway server in the first chain that is hosting the first client device is not functioning and hosting the first client device by the subsequent gateway server in the first chain; and
   detecting that a gateway server in the second chain that is hosting the second client device is not functioning and hosting the second client device by the subsequent gateway server in the second chain.

3. The method of claim 2, further comprising each of the gateway servers in the sequence acknowledging receipt of the electronic message after receiving the electronic message.

4. The method of claim 3, wherein detecting that the gateway server in the first or second chain is not functioning is based on the gateway server in the first or second chain failing to acknowledge receipt of the electronic message.

5. The method of claim 1, further comprising deleting the electronic message from each message queue associated with the sender and from each message queue associated with the recipient based on detection of a triggering event.

6. The method of claim 5, wherein the triggering event comprises the electronic message being received at the second client device or a response to the electronic message being sent from the second client device.

7. The method of claim 5, further comprising:
   deleting the electronic message from each message queue associated with the sender and from each message queue associated with the recipient based on an expiration of a specified time period;

storing a copy of the electronic message in an external storage based on the expiration of the specified time period; and deleting the electronic message from the external storage based on detection of the triggering event.

8. A system comprising:

a message transmission module comprising at least one processor and configured to:
  assign a first chain of gateway servers to a first client device, the first chain starting at a first gateway server of the gateway servers that hosts the first client device and ending at a second gateway server of the gateway servers;
  assign a second chain of the gateway servers to a second client device, the second chain starting at a third gateway server of the gateway servers that hosts the second client device and ending at a fourth gateway server of the gateway servers;
  detect that an electronic message, from a sender associated with the first client device to a recipient associated with the second client device, is received at the first gateway server;
  determine a sequence of the gateway servers that starts at the first gateway server and ends at the third gateway server, the sequence comprising the first and second chains;
  instruct each of the gateway servers in the sequence to send the electronic message to the subsequent gateway server in the sequence;
  store the electronic message in a message queue associated with the sender in each of the gateway servers of the first chain, and
  store the electronic message in a message queue associated with the recipient in each of the gateway servers of the second chain.

9. The system of claim 8, the message transmission module further configured to:
  detect that a gateway server in the first chain that is hosting the first client device is not functioning and instruct the subsequent gateway server in the first chain to host the first client device; and
  detect that a gateway server in the second chain that is hosting the second client device is not functioning and instruct the subsequent gateway server in the second chain to host the second client device.

10. The system of claim 9, wherein the message transmission module is further configured to receive an acknowledgement of receipt of the electronic message from each of the gateway servers in the sequence.

11. The system of claim 10, wherein the message transmission module is further configured to detect that the gateway server in the first or second chain is not functioning based on the gateway server in the first or second chain failing to acknowledge receipt of the electronic message.

12. The system of claim 8, wherein the message transmission module is further configured to delete the electronic message from each message queue associated with the sender and from each message queue associated with the recipient based on detection of a triggering event.

13. The system of claim 12, wherein the triggering event comprises the electronic message being received at the second client device or a response to the electronic message being sent from the second client device.

14. The system of claim 12, wherein the message transmission module is further configured to:

delete the electronic message from the respective message queues in each of the gateway servers in the first and second chain based on expiration of a specified time period;

store a copy of the electronic message in an external storage based on expiration of the specified time period; and delete the electronic message from the external storage based on detection of the triggering event.

15. A non-transitory storage medium storing instructions that are executable by at least one hardware processor of a machine to cause the machine to perform operations including:
  assigning a first chain of the gateway servers to a first client device, the first chain starting at a first gateway server of the gateway servers that hosts the first client device and ending at a second gateway server of the gateway servers;
  assigning a second chain of the gateway servers to a second client device, the second chain starting at a third gateway server of the gateway servers that hosts the second client device and ending at a fourth gateway server of the gateway servers;
  receiving, at the first gateway server, an electronic message from a sender associated with the first client device to a recipient associated with the second client device;
  determining a sequence of the gateway servers that starts at the first gateway server and ends at the third gateway server, the sequence comprising the first and second chains;
  sending, by each of the gateway servers in the sequence, the electronic message to the subsequent gateway server in the sequence;
  storing the electronic message in a message queue associated with the sender in each of the gateway servers of the first chain, and
  storing the electronic message in a message queue associated with the recipient in each of the gateway servers of the second chain.

16. The storage medium of claim 15, the operations further comprising:
  detecting that a gateway server in the first chain that is hosting the first client device is not functioning and hosting the first client device by the subsequent gateway server in the first chain; and
  detecting that a gateway server in the second chain that is hosting the second client device is not functioning and hosting the second client device by the subsequent gateway server in the second chain.

17. The storage medium of claim 16, the operations further comprising each of the gateway servers in the sequence acknowledging receipt of the electronic message after receiving the electronic message.

18. The storage medium of claim 17, wherein detecting that the gateway server in the first or second chain is not functioning is based on the gateway server in the first or second chain failing to acknowledge receipt of the electronic message.

19. The storage medium of claim 15, the operations further comprising deleting the electronic message from each message queue associated with the sender and from each message queue associated with the recipient based on detection of a triggering event, wherein the triggering event comprises the electronic message being received at the second client device or a response to the electronic message being sent from the second client device.

20. The storage medium of claim 15, the operations further comprising:
- deleting the electronic message from each message queue associated with the sender and from each message queue associated with the recipient based on an expiration of a specified time period;
- storing a copy of the electronic message in an external storage based on the expiration of the specified time period; and
- deleting the electronic message from the external storage based on detection of the triggering event.

* * * * *